2,783,096
SOLIDS LEVEL INDICATION AND CONTROL SYSTEM

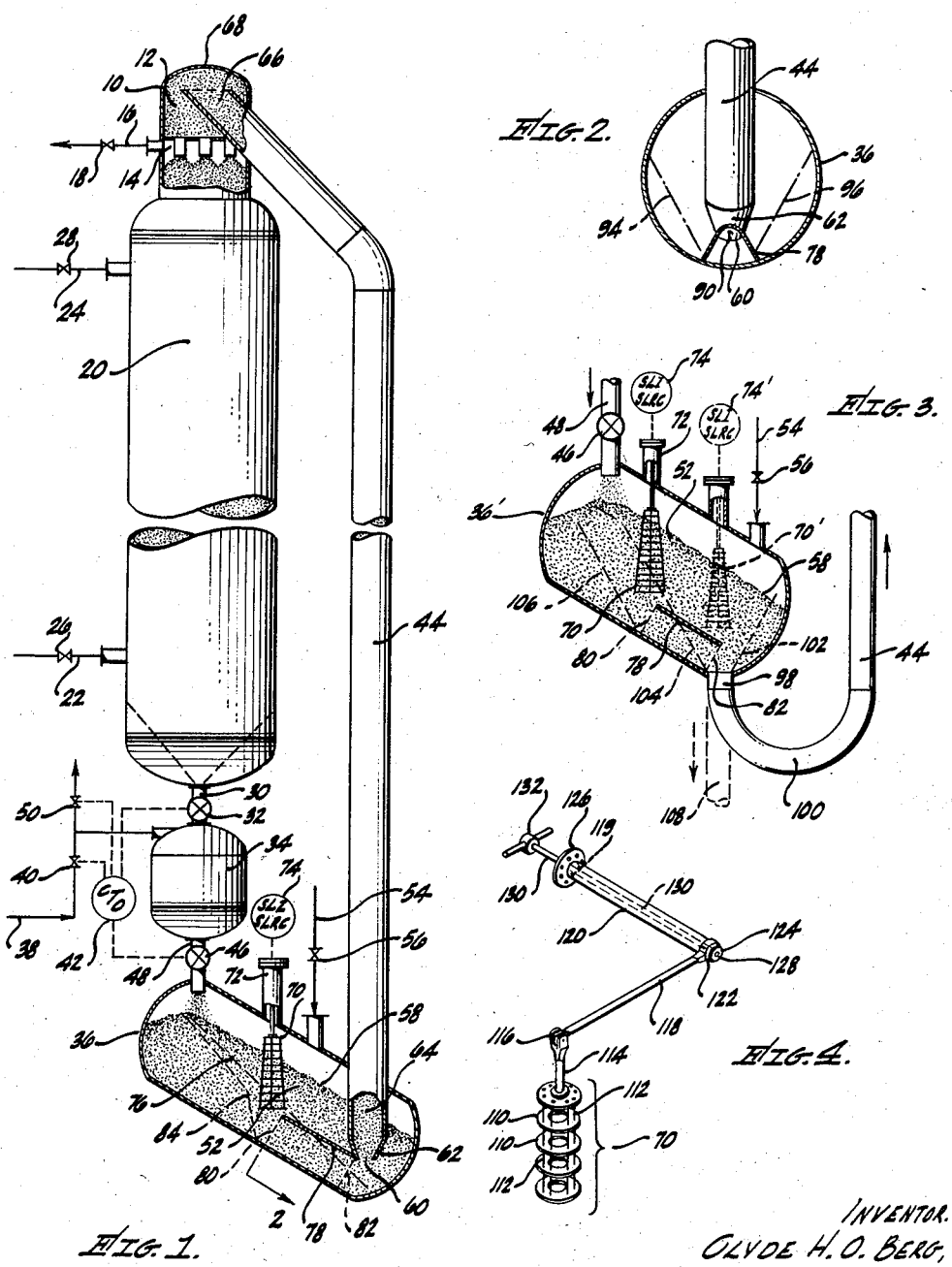

Clyde H. O. Berg, Long Beach, Calif., assignor to Union Oil Company of California, Los Angeles, Calif., a corporation of California Application November 18, 1954, Serial No. 469,670

16 Claims. (Cl. 302—53)

This invention relates to the indication and control of the location of upper surface of a moving bed of granular solids, and particularly relates to the indication and control of these solids levels moving in vessels or chambers whose longitudinal axis is inclined up to about 60 degrees from the vertical.

Systems in which solids are moved in compact bed form include the loading and unloading of storage bins, railroad cars, etc., solids circulation systems including the movement of solid granular adsorbent in fluid treating and fractionating systems, the circulation of solid contact materials such as coke, alumina, etc. as a contact material in high temperature noncatalytic reaction processes, the circulation of solid contact catalysts such as those employed in the well known hydrocarbon conversion reactions in which hydrocarbons are coked, cracked, hydrocracked, reformed and aromatized, desulfurized, hydrogenated or dehydrogenated, polymerized, etc., and in the many other well known industrial processes in which moving beds of granular solids are employed as heat carriers catalytic or noncatalytic media or the like.

In any and all of these operations in which a moving bed of granular solids is involved, some system for the indication and/or control of the position of the upper solids surface or solids level in the container is required. This is especially true when the solids are being loaded into or unloaded from a vessel and the minimum and maximum levels need be known or controlled. Such indicating and control systems are also extremely important in continuous systems in which the granular solids are continuously removed from and replenished in the vessel containing them so as to maintain therein a mass of moving solids, the upper surface or level of which may fluctuate in position during operations. In some solids circulation operations, this solids level may be required to be maintained at a certain position for any one of a number of reasons, including the maintenance of sealing leg filled with moving solids, or to indicate the inventory of solids in a closed circulatory system, thus giving a measure of the degree of solids loss as it occurs so that additional new solids may be introduced to make it up.

When the moving solids as described generally above are circulated as a moving bed through one or more contact columns, they are passed downwardly by gravity through a contacting column and conveyed or lifted from the bottom of one column to the top of the same or a different column to provide a complete solids cycle. During this solids cycle, some lateral motion of the solids is required and this generally occurs by gravity through an inclined transfer line or transfer vessel from the bottom of the column to the bottom of the conveyor or from the top of a conveyor to the top of a contact column. There is also a certain amount of lateral solids flow occurring when the solids are discharged from a conveyor into a large diameter vessel in that a substantial quantity of the solids flows downwardly along the surface of the conical pile of solids.

The fact that the vessel or conduit is inclined prevents the granular solids from flowing as a plug as in a vertical vessel and in which no substantial movement of one granule relative to the others around it takes place. In such inclined solids beds, solids introduction and removal generate and maintain a complex velocity gradient in which the granular solids flow laterally at relatively high velocity along the upper solids surface and at very low velocity at the bottom of the inclined vessel. Also the downward solids velocity above and around the outlet opening, that is within the normal drainage cone hereinafter more fully defined, is relatively high whereas the downward velocity of the solids any substantial distance below the solids inlet may be found to be near zero. The normal drainage cone referred to above is defined as the inverted conical volume within a moving solids bed and whose apex coincides with the solids outlet and within which cone the granular solids move downwardly toward said outlet and outside of which the granular solids velocity downwardly toward the outlet is extremely low or practically zero.

In each of the systems briefly described above the level or the position of the upper solids surface in the downwardly and laterally moving pile of granular solids is significant, and although there are several adequate systems for detecting the position of solids beds which move downwardly only, this lateral flow referred to usually exerts forces which seriously interfere with the indication of the solids level.

The present invention is directed to a novel and improved solids level indicating and control system wherein the level of laterally and downwardly moving solids beds can be adequately detected and controlled.

It is the primary object of the present invention to provide for the measurement and control of the position of the upper surface of a bed of solids which moves downwardly and laterally by gravity.

It is a more specific object of this invention to provide an improved system for the indication and control of solids levels where such solids levels exist within an inclined vessel having a solids inlet near the top and a solids outlet near the bottom and in which the usual lateral solids flow exerts no interference with the level detection.

It is also an object of the present invention to provide in a solids fluid contact system using a recirculating stream of granular solid contact material an improved solids level detecting and control system in which the inventory of solids therein is such that only one free solids level exists which is free to fluctuate and indicate the inventory in the solids in an inclined vessel which is included in the solids cycle.

Other objects and advantages of this invention will become apparent to those skilled in the art as the description and illustration thereof proceed.

Briefly the present invention comprises, in combination with an inclined vessel through which the granular solids flow as a moving bed partially filling said vessel, vertically movable solids level detecting grid disposed in partial contact with the inclined moving bed of solids therein. The grid is of a construction which adapts it to react from the normal gravitational forces exerted by the moving solids. One form of grid which has been found adequate consists of a series of circular plates with their centers punched out, said plates being vertically disposed and spaced apart from one another with a series of spacing bars to provide an open elongated grid structure. This grid is disposed within the vessel so that it extends at least substantially from the expected high solids level down to the point of expected low solids level.

With a grid of such structure or any other suitable structure, the movement of granular solids down and around the grid exerts on the grid gravitational and frictional forces which have been found to be proportional to the degree to which the grid is submerged in the solids, and hence is proportional to the solids level. By providing the movable grid with a deflectable support the degree of deflection may then be employed to give indications of the solids level and may be employed to actuate suitable control instruments to control the solids level.

The lateral motion of solids past the grid tends to misalign it and to exert different forces than those for which the grid is designed to detect. Accordingly when such levels are to be detected and controlled in vessels having solids inlet at a high point and a solids outlet at a low point which is laterally displaced from the inlet, the grid must often be located at a point in between the outlet and the inlet because of sheer mechanical considerations. When the solids are removed from the bottom of the inclined solids bed and an intermittent or continuous replenishment of the solids is effected, the granular solids flow laterally and downwardly past the grid toward the outlet rendering solids level indications in error.

To overcome the aforementioned velocity gradient problems and eliminate inaccuracies caused by the lateral motion of solids at the surface in systems wherein the level detecting grid cannot be located within the normal drainage cone of the solids outlet, the improved system of the present invention includes a submerged solids flow zone such as a channel or conduit disposed entirely within the laterally moving bed of solids and which is open at both ends. This submerged channel may conveniently extend downwardly along and have a common lower surface with the lower inclined surface of the vessel itself. The channel communicates at its upper open end with a point below the vertical axis of said grid and at its lower end with the normal drainage cone of the solids outlet.

The effect of such a structure in operation is to force the movement of solids in the normal drainage cone, when solids are removed from the solids outlet, to draw part of the solids through said inclined submerged channels thereby increasing the lateral solids velocity therein and generating and maintaining above the channel inlet a "parasitic drainage cone" which surrounds the solids level detecting grid. This effect results primarily from the fact that the outlet of the submerged channel intersects with the normal drainage cone of the solids outlet from the inclined vessel. Accordingly when solids are removed from the vessel outlet and solids movement in the normal drainage cone takes place, part of these solids come from the normal drainage cone and the remainder is drawn through that portion of the outlet opening of the submerged channel which intersects the normal drainage cone. The result as far as concerns the detecting grid is an arresting of the usual lateral solids motion in the vicinity of the grid and the maintenance of the generally downwardly moving solids within the "parasitic drainage cone" above the channel inlet. In this parasitic drainage cone surrounding the grid the same gravitational or frictional forces are exerted by the downwardly moving solids therein against the grid causing a deflection which is directly proportional to the level of solids therein.

The removal of granular solids from the low point in the inclined vessel is all that is required to cause the foregoing result to take place and the direction in which the granular solids are moved after withdrawal from the vessel is of no consequence. For example, the granular solids may be withdrawn downwardly by gravity as a moving bed through a sealing leg or any conduit to any lower discharge point, or the granular solids may be discharged from the solids outlet into a conveyor in which the solids are transported in the presence of a fluid flow horizontally or generally upwardly, either in suspension in the fluid or as a compact moving mass. As hereinafter more fully illustrated, this conveyance may just as well take place along a vertical axis which is laterally displaced from or coincides with the vertical axis of the aforementioned normal drainage cone of solids.

The present invention will be more readily understood by reference to the accompanying drawings in which:

Figure 1 is an elevation view in partial cross section of a contact column adapted to the contact of fluids with a recirculating stream of granular solids and in which a free solids level exists in the system at a point within an inclined vessel communicating the bottom of a contact column with a bottom of a solids conveyance means, Figure 2 is a transverse elevation view of the inclined vessel showing the intersection of the submerged channel with the solids outlet from the vessel, Figure 3 is an elevation view in cross section of an inclined vessel in which a downwardly opening solids outlet communicates through a return bend conveyor for vertical conveyance of the solids, and Figure 4 is an isometric detail drawing of one form of the grid and the associated equipment for actuating an indicating or controlling instrument in the apparatus of this invention.

Referring now to Figure 1, the improved system of the present invention is shown as applied to a solids-fluid contacting process in which a recirculated stream of granular solids is employed. The granular solids are discharged from a conveyor into separator vessel 10 and pass downwardly as a moving bed 12 through conveyance fluid disengaging zone 14. At least a portion of the conveyance fluid is removed therefrom through line 16 at a rate controlled by valve 18. The granular solids continue downwardly by gravity through contacting column 20 provided with inlets and outlets 22 and 24 controlled respectively by valves 26 and 28. The fluid passing through column 20 may be engaged with and disengaged from the downwardly moving bed of solids by means of engaging and disengaging zones not shown but which are similar to disengaging zone 14. The fluid flow may be countercurrent to or concurrent with the downwardly moving bed of solids in column 20.

The spent granular solids are removed from the bottom of contacting column 20 through line 30 controlled by valve 32 which acts as a solids flow restriction at the bottom of the column to maintain the downflow of solids therein in solid bed form. The solids are discharged periodically into solids pressuring vessel 34. If desired, a plurality of pressuring vessels 34 may be employed, each intermittently operated as hereinafter described, whereby a continuous removal of solids from the bottom of column 20 and a continuous introduction of pressured solids into inclined vessel 36 may be maintained. When a charge of spent solids is introduced into vessel 34, valve 32 is closed and a quantity of a pressuring fluid is introduced through line 38 at a rate controlled by valve 40 in accordance with cycle timer operator 42. The quantity of fluid so introduced is controlled so as to raise the pressure of fluids present in the solids' interstices of spent solids vessel 34 by an amount substantially equivalent to the pressure differential existing between the bottom and the top of conveyance-contacting zone 44 hereinafter more fully described. Valve 40 is then closed and valve 46 is opened to permit the pressured solids to discharge through outlet 48 into the upper portion of inclined vessel 36. Valve 46 is then closed and valve 50 is opened to vent a quantity of fluid from pressuring vessel 34 sufficient to decrease the pressure thereof to a value substantially the same as contacting vessel 20. Valve 50 is then closed and valve 32 is reopened to admit an additional charge of spent solids. The cycle of operations is then repeated at a frequency dependent upon the volumetric capacity and the number of pressuring vessels 34 to pressure spent solids at a rate equal to the solids circulation rate.

The pressured solids are introduced into the upper portion of inclined vessel 36 and pass downwardly therethrough at various velocities as an inclined moving bed 52. A conveyance-contacting fluid is introduced into vessel 36 through line 54 at a rate controlled by valve 56 and at a pressure substantially equal to that of the pressured solids to which previous reference was made. The conveyance-contacting fluid enters solids bed 52 through solids level or interface 58, permeates the permeable solids mass, and passes downwardly toward the inlet opening 60 of conveyance-contacting vessel 44, which is also the solids outlet opening from vessel 36. Inlet opening 60 is provided with an inlet restriction in the form of nozzle 62 which increases the fluid velocity at the entrance of vessel 44 and aids in the introduction of solids thereinto. The fluid passes upwardly through the permeable compact mass of solids indicated generally at 64 within vessel or conduit 44. The solids within vessel 44 move upwardly as a dense mass under the influence of a pressure gradient $$\frac{dp}{dl}$$

which in turn is generated by the conveyance-contacting fluid depressuring through the permeable mass of solids. The pressure differential between inlet 60 and outlet 66 is controlled at a value sufficiently high relative to the permeability of the moving solids mass and the length of conveyance-contacting vessel 44 so that the pressure gradient $$\frac{dp}{dl}$$

in pounds per square foot per foot satisfies the following equation:

$$\frac{dp}{dl} \geq \rho_s \cos \theta$$

wherein $\rho_s$ is the normal static bulk density in pounds per cubic foot of the solids when at rest and $\theta$ is the angular deviation of the conveyance direction in vessel 44 from a vertical upward reference axis.

When these conditions are satisfied the pressure gradient existing at all points within column 44 is sufficient to move the solids upwardly against gravity therein in the form of an upwardly moving compact mass of solids having the same bulk density of the same solids at rest. The solids are not suspended or fluidized in the contacting fluid but move upwardly in the same dense plug type flow and at the same bulk density as the downwardly moving bed of solids in contacting bed 20 so long as the granular solids are supplied at inlet opening 60 and removed from outlet opening 66. The dense mass of granular solids is discharged at outlet 66 so as to apply a solids flow restriction against the solids discharge. This may be done in a number of ways but in the present instance it is done by discharging them upwardly against an inside surface 68 of solids separator 10. This applies a restriction against the discharging solids and maintains them in compact form at substantially their static bulk density throughout vessel 44. In solids separator vessel 10, the flowing mass of solids reverses its flow direction and passes by gravity as a continuous dense moving mass downwardly into and through contacting column 20 wherein it is contacted with further quantities of fluid.

It should be noted that in this system substantially the entire quantity of solids being recirculated exist as a single, continuous moving mass of dense compact solids extending from solids level 58 in inclined vessel 36 upwardly through conduit 44 and then downwardly through vessel 20 to valve 32 so that solids level 58 accurately indicates the solids inventory in the apparatus at any time.

Referring now particularly to the lower part of Figure 1, solids level detecting grid 70 is disposed within inclined vessel 36 at a point laterally between the solids inlet 48 to and solids outlet 60 from vessel 36. The grid is so disposed as to extend through solids surface or "level" 58 and thus it is partially submerged in solids at all times. Solids grid 70 is mechanically connected through connection 72 with solids level indicator or solids level recorder controller instrument 74 by means of which the position of solids level 58 is continuously detected and/or controlled.

With solids entering vessel 36 at solids inlet 48 and being removed therefrom at point 60 through contacting column 44 it has been found that the solids above and to the right of flow line 76 are moving downwardly and to the right toward inlet opening 60 whereas the solids below and to the left of flow line 76 are relatively stagnant. The flow line shown is only approximate and is used as an illustration because actually a velocity gradient exists with the velocities decreasing with depth in the solids bed. The lateral flow of solids to the right and downwardly past grid 70 is not as effective as a downward flow of solids in giving accurate indications of the position of solids level 58. Accordingly, in the system of the present invention a submerged channel 78 is provided in the form of an inverted U-shaped, V-shaped, or other shaped longitudinal trough or conduit closed along its upper surface and preferably having a common lower surface with inclined vessel 76. Inlet opening 80 at the upper left of channel 78 is disposed at a position immediately below grid 70 while outlet opening 82 is disposed immediately adjacent inlet opening 60 of conveyance-contacting column 44 and within the normal drainage cone.

In this manner the pick-up of spent solids from mass 52 and their passage through inlet opening 60 into column 44 effects a withdrawal of solids from lower outlet opening 72 of submerged channel 78, this in turn effects a movement of solids downwardly through channel 78 and the drainage of solids from bed 52 at inlet opening 80 of the channel. The flow line 76 is then warped into the configuration 84 which indicates the establishment and maintenance of a parasitic drainage cone adjacent opening 80 and surrounding grid 70. The lateral solids flow in bed 52 is arrested, a generally downward solids flow is initiated and maintained around grid 70, and normal gravitational and frictional forces of the moving bed react with and cause the deflection of grid 70 to register the portion of solids level 58.

As a specific example, the solids level indication and control system of the present invention was applied to a hydrocarbon conversion process in which a hydrocarbon naphtha was contacted at a rate of 1100 barrels per day with a cobalt molybdate impregnated silica stabilized alumina base catalyst circulated at a rate of 860 pounds per hour in a system which is substantially as shown in Figure 1. The pressure of operation was 400 pounds and the average conversion temperature was 900° F.

The inclined transfer and induction vessel 36 was 2.0 feet in outside diameter, 7 feet 6 inches in over-all length, and disposed at an angle with its longitudinal axis inclined 60 degrees from the vertical. The vessel was operated so that the inclined vessel was approximately two-thirds full of downwardly moving catalyst. The grid structure consisted of a series of flat serrated plates spaced apart from one another to an over-all distance of 18 inches and it was disposed in contact with the moving solids bed at a point intermediate the solids inlet and solids outlet because the solids outlet was a solids lift line extending vertically from a low solids pick-up point in the inclined vessel. The submerged channel consisted of an inverted trough 2 feet 4 inches long, 4 inches wide at its point of coincidence with the bottom of the inclined vessel and 4 inches high. It extended from its open inlet end at a point 6 inches below the grid structure to its outlet end which intersected with the inlet opening of the conveyance-contacting column. Whereas the solids level indicating and control mechanism without the submerged channel is subject to such problems as lateral grid deflection which prevented vertical deflection, the system according to the present invention was free of these problems, gave increased deflections with variation in solids level which are about 400% higher than those without the submerged channel.

Referring now more particularly to Figure 2 elements indicated therein which are the same as those indicated and described in Figure 1 are herein indicated by the same numbers. Figure 2 is a cross section view transverse to that shown in Figure 1 and looking downwardly toward nozzle 62 through submerged channel 58. The point of intersection is indicated at 90 and the lateral flow lines 92 and 94 indicate approximately the extent of the normal drainage cone of solids included therebetween. It should be understood that the specific cross section of submerged channel 78 shown in Figure 2 should not be considered limiting since actually any form of conduit may be employed in this service providing it intersects at its outlet end with the normal drainage cone immediately adjacent the solids outlet and has its inlet opening disposed generally below the lower end of the grid structure.

Referring now to Figure 3 an inclined vessel similar to that indicated in Figure 1 is shown but it is modified to the extent that several other forms of granular solids outlet are indicated. The otherwise identical elements are herein indicated by the same numbers and a description of these elements may be found in connection with the description of Figure 1.

In Figure 3 inclined vessel 36' is provided with the solids inlet 48, grid structure 70, and a solids outlet 98 which opens downwardly through an arcuate return bend conduit 100 which in turn opens upwardly into the lower part of conveyance-contacting column 44. The solids pass downwardly through outlet 98 under the influence of gravity and the concurrent flow of the conveyance-contacting fluid introduced through line 54, pass through an arcuate path in conduit 100, and are conveyed through conveyance-contacting column 44 as previously described as a moving dense mass. The normal drainage cone is indicated between flow lines 102 and 104 immediately above solids outlet 98. If it were possible to locate grid 70 immediately above solids outlet 98 in the position indicated at 70' within the normal drainage cone, the downwardly moving solids therein usually generate satisfactory gravitational and frictional forces in grid 70' to give a good indication of the position of solids level 58.

It is not however always possible to so locate grid 70' because of location of other equipment and the like and frequently it is therefore necessary to locate it in the position as shown at 70 laterally intermediate solids inlet 48 and solids outlet 98. In such a situation submerged channel 78 is provided according to the principles of this invention so that solids inlet 80 is disposed immediately below grid 70 and solids outlet 82 intersects the normal drainage cone which is found between flow lines 102 and 104 as previously described. In this way the normal drainage cone is disturbed so that the solids flow into opening 80 below grid 70 in a parasitic drainage cone and flow line 106 exists because of the downward motion of solids into inlet 80 around grid 70.

Another modification of solids outlet is indicated in Figure 3 at 108 which is a downwardly opening conduit through which the solids are removed by gravity. The normal drainage cone and the solids flow pattern resulting from the operation of submerged channel 78 are substantially identical to those described previously. In either case a substantially improved indication of solids level in instrument 74 is obtained.

Referring now to Figure 4 an isometric view of the grid structure and a suitable supporting system therefor is shown. Herein grid structure 70 is made up of a plurality of superimposed plates 110 spaced apart from each other by spacing bars 112. A support rod 114 extends vertically from the top of grid structure 70 and is attached by means of clevis 116 or other suitable connection to lever 118. Lever 118 is connected at substantially right angles to torque tube 120 by means of connection 122. The end of torque tube 120 is closed and sealed against fluid flow at 124. The other end of torque tube 120 is provided with flange 126 by means of which it is integrally attached to a vessel wall so that it is prevented from rotation and sealed against fluid flow. An actuator rod 130 runs longitudinally through and out the open end 119 of torque tube 120 and is integrally attached at point 128 to closed end 124 of the torque tube. Rod 130 is connected to an electrical rheostat or a throttling valve 132 within a control instrument and is adapted to provide a variable electrical current or a variable pressure fluid stream, the value of which is proportional to the level of solids along the length of grid 70.

As the solids level rises or falls along the length of grid 70, the downwardly acting forces of gravity and friction rise or fall generating a higher or lower turning movement through lever 118 at the closed end of torque tube 120. This deflection is resisted by higher or lower torsional forces generated within torque tube 120. The torsional strain or deflection of the closed end of torque tube 120 is transmitted by means of actuator rod 130 to rheostat or valve 132 to provide an electrical current or fluid current pressure which is proportional to the solids level within the vessel.

It should be understood that structures different from the specific ones shown in Figure 4 may be employed in the practice of the present invention, and any physical structure, preferably one having an extended area disposed vertically upon which the gravitational and frictional forces may act may be employed in the inlet contact conveying solids according to this invention. It is not intended that the system of the present invention be applied only to the moving solids process described by way of an example in connection with Figure 1, but it may be readily applied to the level detection and control in other laterally moving solids systems having an inclined conduit or vessel by one skilled in the art based upon the description given above.

A particular embodiment of the present invention has been hereinabove described in considerable detail by way of illustration. It should be understood that various other modifications and adaptations thereof may be made by those skilled in this particular art without departing from the spirit and scope of the invention as set forth in the appended claims.

I claim:

1. An improved method for the handling of granular solids beds moving in a direction inclined from the vertical and detecting the location of the upper surface of the solids bed which comprises maintaining the moving bed by supplying solids thereto from an elevated inlet point and removing solids therefrom at a laterally displaced low outlet point, detecting the position of the upper surface of the moving solids bed at a point between said inlet and outlet points, establishing a submerged solids flow zone within said solids bed communicating at its outlet opening with said low outlet point and at its inlet with a point below said point of solids surface detection, a flow of solids being maintained through said submerged solids flow zone by the removal of solids from said laterally displaced low outlet point.

2. An improved method for handling granular solids moving as a dense bed through a zone in a direction inclined from the vertical and detecting the level of such solids bed which comprises introducing solids into said zone at an elevated point, removing solids from said zone at a low point so as to maintain a laterally and downwardly moving solids bed therein, detecting the position of the upper surface of said solids bed at a point between the solids inlet and outlet, and generating and maintaining a parasitic drainage cone of solids surrounding said point of solids surface position detection by the step of passing a portion of the solids in said moving bed through a submereged solids flow zone within said bed and communicating at its inlet with a point below said point and at its outlet with the normal drainage cone of solids in said bed above said solids outlet therefrom.

3. A method for continuously detecting the position of the solids level in a zone in which the solids exist as a downwardly and laterally moving bed which comprises removing solids from a low outlet point and replenishing solids at a high inlet point in said zone to maintain said moving bed having a normal drainage cone superjacent said outlet therein and into which cone said solids flow laterally and downwardly from said inlet and within which cone the solids move downwardly toward said outlet, detecting the position of the solids level of said laterally moving bed at a point between said inlet and said outlet, and passing a part of said solids from below said point through a submerged solids flow zone within said moving bed into said normal drainage cone thereby maintaining a parasitic drainage cone of downwardly moving solids in said bed and below said point.

4. A method according to claim 3 in combination with the step of adding additional solids to raise said level when a low level is detected so as to control said level substantially at a predetermined position.

5. In a continuous process wherein a stream of solid granular material is recirculated through at least one vessel and at least one solids conveyance zone, the improvement which comprises flowing solids from said vessel into and downwardly and laterally through an inclined solids transfer zone toward the lower solids outlet thereof as an inclined moving bed of solids, detecting the position of the solids level of said moving bed in said inclined transfer zone at a point intermediate the solids inlet and outlets thereof, and passing said solids from said inclined transfer zone through its lower outlet into said conveyance zone to generate a normal solids drainage cone of downwardly moving solids above said outlet and cause solids to move through an inclined solids flow zone submerged in said moving bed and having its outlet opening communicating with said normal solids drainage cone and its inlet opening disposed below said point of solids level detection thereby generating a parasitic solids drainage cone around said point.

6. A process according to claim 5 wherein said solids are recirculated as a single continuous dense moving bed extending from said solids bed in said inclined solids transfer zone upwardly through said conveyance zone and downwardly through said vessel, in combination with the step of adding additional solids into the recirculating stream when a solids inventory in the system is indicated by a low solids level detected in said solids transfer zone.

7. A process according to claim 6 in combination with the step of pressuring said solids from the bottom of said vessel through a solids pressuring zone into said inclined solids transfer zone, introducing a fluid under pressure into said transfer zone to maintain it at a substantially higher pressure than that of said vessel and to cause fluid flow through said conveyance zone at a rate sufficient to overcome forces of gravity and friction acting on said solids therein, and applying a solids flow restricting force against said solids discharging at the outlet of said conveyance zone to maintain the upwardly moving solids therein at a bulk density substantially equal to that of said solids when at rest.

8. An improved apparatus for handling granular solids beds moving in a direction inclined from the vertical which comprises a vessel containing the laterally and downwardly moving solids, an upper solids inlet and a lower solids outlet laterally displaced from said inlet and each communicating with said vessel, a vertically movable grid structure disposed within said vessel and extending through the inclined upper surface of said solids, and a solids flow conduit submerged within said solids bed and having its inlet opening at a point below said grid structure and its outlet opening adjacent said lower solids outlet in solids discharging relation thereto.

9. An apparatus according to claim 8 wherein said lower solids outlet comprises a conduit opening downwardly from the lower part of said vessel.

10. An apparatus according to claim 8 wherein said vessel is a closed pressure resistant vessel, in combination with a fluid inlet conduit opening into the upper part thereof at a point above the upper surface of said moving solids bed, and wherein said lower solids outlet has its inlet opening at a low point in said vessel and extends generally upwardly therefrom as a solids conveyance conduit.

11. An apparatus according to claim 10 in combination with means for applying a solids flow restriction against discharging solids at the outlet of said solids conveyance conduit, and a vessel connected in solids receiving relation to said conveyance conduit and in solids delivery relation through another solids flow restrictive means with said pressure resistant vessel to form a closed cyclic path for solids flow.

12. An apparatus according to claim 8 in combination with a grid structure support means which comprises a torque tube rigidly secured at one end, a lever rigidly attached at one end thereof at substantially right angles to the other end of said torque tube, said grid structure being suspended at an angle from the other end of said lever, an actuator rod integrally attached to the point of juncture of said lever and said torque tube and extending through said tube and adapted to register the torsional strain of said torque tube as a measure of the position of said solids level in said vessel, and means connected to said actuator rod for indicating said torsional strain.

13. An apparatus according to claim 8 wherein said vessel is disposed with its longitudinal axis inclined not more than about 60° from the vertical, and said solids flow conduit comprises an inclined conduit disposed along the lower surface of said vessel and submerged by the moving bed of solids therein.

14. An apparatus for handling the flow of granular solids in dense moving bed form through an inclined path and accurately detecting the level thereof which comprises an inclined conduit adapted to confine said granular solids moving in said inclined path, a solids inlet opening into said inclined conduit at a high point and a solids outlet opening therefrom at a low point, a vertically movable grid structure adapted to be deflected vertically by gravitational and frictional forces of a moving bed of solids, said grid structure being disposed vertically through the upper surface of said moving bed, and a solids flow conduit submerged below said upper surface of said solids and having an inclination substantially the same as that of said inclined conduit and extending from its upper inlet opening at a point below the lower end of said grid structure to its lower outlet opening at a point immediately adjacent said solids outlet from said inclined conduit in solids delivery relation thereto.

15. An apparatus according to claim 14 in combination with a vertically elongated column and a vertically elongated solids conveyance conduit interconnected at their upper ends, said inclined conduit being connected at its solids inlet with the bottom of said column and at its solids outlet with the lower opening of said conveyance conduit forming a closed cyclic solids circulation path, an inlet conduit for a conveyance fluid under pressure opening into the top of said inclined conduit, an outlet conduit for said fluid from adjacent the top of said conveyance conduit, and means for restricting solids flow from the top of said conveyance conduit and from the bottom of said column to maintain a single continuous mass of dense moving solids extending from the bottom to the top of said column and then downwardly through said conveyance conduit whereby the level of solids in said inclined conduit indicates solids inventory moving in said closed cyclic path.

16. An apparatus according to claim 14 wherein said solids flow conduit submerged in said moving bed of solids comprises an inverted trough extending along the bottom of said inclined vessel.

References Cited in the file of this patent

UNITED STATES PATENTS

| | | |
|---|---|---|
| 2,673,832 | Lassiat | Mar. 30, 1954 |
| 2,684,124 | Hines | July 20, 1954 |